Wᴹ B. Guernsey.
Electro Magnetic Alarms.

No. 112706 — Patented Mar 14 1871

WITNESSES.
Octavius Knight
Jas. L. Ewin

INVENTOR.
W. B. Guernsey

United States Patent Office.

WILLIAM B. GUERNSEY, OF JERSEY CITY, NEW JERSEY.

Letters Patent No. 112,706, dated March 14, 1871.

IMPROVEMENT IN ELECTRO-MAGNETIC BURGLAR-ALARMS.

The Schedule referred to in these Letters Patent and making part of the same.

I, WILLIAM B. GUERNSEY, of Jersey City, in the county of Hudson and State of New Jersey, have invented certain new and useful Improvements in Electro-magnetic Alarms, of which the following is a specification.

Nature and Objects of the Invention.

In my patent No. 108,257, dated the 11th day of October, 1870, I describe how a combined open and closed circuit-alarm, provided with a resistance or obstructed conductor may be arranged to act, either by severing the conductor or by short-circuiting past or around said resistance, so as to avoid the obstruction.

My present invention consists in so locating or arranging a battery or batteries, in connection with a conductor and an electro-magnet, galvanometer, or its equivalent, that an alarm will be produced by cutting out a battery, either by severing the conductor or closing a short circuit between the poles.

In carrying out this invention I prefer to arrange one or more conductors in connection with a plurality of batteries, and an electro-magnet, galvanometer, or other device, to be actuated by electricity in such a manner that, while the apparatus is in its normal condition, one battery will so far balance or counteract another as to render the magnet, or its equivalent, inactive, but in the event of the current from one of the batteries being cut off from the coil by either short-circuiting or severing the circuit, the unobstructed current of the battery or batteries will cause the magnet, or its equivalent, to act so as to close a local circuit and sound a continuous alarm, which cannot be interrupted except by a party at or near the instrument. The closing of this local circuit may be made to so break or short-circuit the previously-interrupted circuit as to prevent said circuit being effectively reclosed at the point where the alarm first originated.

Description of the Accompanying Drawing.

General Description.

Figure 1:
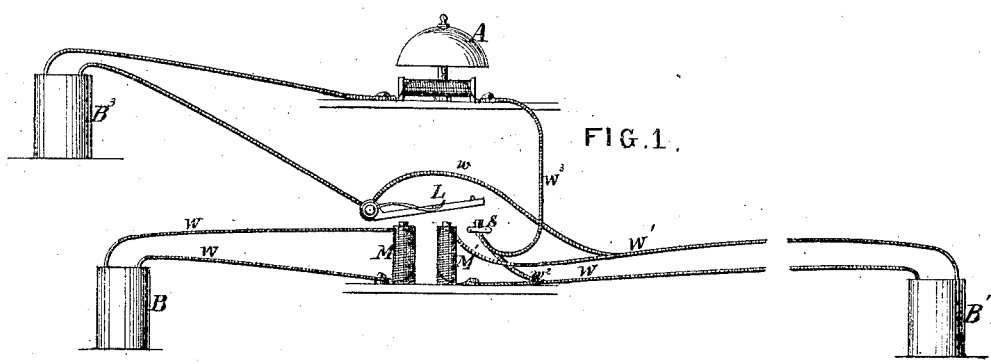
Figure 1 represents an arrangement in which two disconnected circuits are made to act in opposition upon the respective coils of an electro-magnet so as to neutralize each other until one of them is "cut out."

In fig. 1, B B$^1$ represent two batteries, each connected through wires W and W$^1$ with one of the coils of an electro-magnet, galvanometer, or electro-magnetic motor of any suitable form.

L is an armature, which, while the magnet M M' is inactive, is deflected away from it by a spring, as is usual, or by other means.

When the magnet becomes active the armature, being drawn against a stop, S, will close a local circuit, W$^3$, which may be connected either with the battery B or with a special battery, B$^3$. This local circuit, when thus closed, will sound an alarm, A, which may be of any known and suitable form, and does not require specific description.

As the alarm-circuit is independent of that through which the movement originates the alarm will be continuous, and it may, by a simple contrivance, be placed out of the power of a party at the point where the disturbance first originated to again demagnetize the magnet M M' or restore the parts to their original condition.

In the illustration given in fig. 1 this is effected by the following means:

$w^1$ is a branch wire, connected at one end with the main wire W$^1$, and at the other with the pivot of the armature L, or any part of the local circuit W$^3$ connected with said armature.

$w^2$ is another branch wire, connected with the other part of the wire W$^1$ and terminating in the stop S, against which the armature is drawn by the magnet.

It will thus be seen that the closure of the circuit W$^3$ forms a new short circuit for the wires W$^1$, entirely avoiding the magnet M M', so that in the event of the parts where the disturbance originated being restored to their original positions so as to place the other ends of the wires W$^1$ again in connection with the respective poles of the battery B$^1$, the magnet M M' will still be uninfluenced by said battery, but will still be excited by the battery B.

Figure 2:
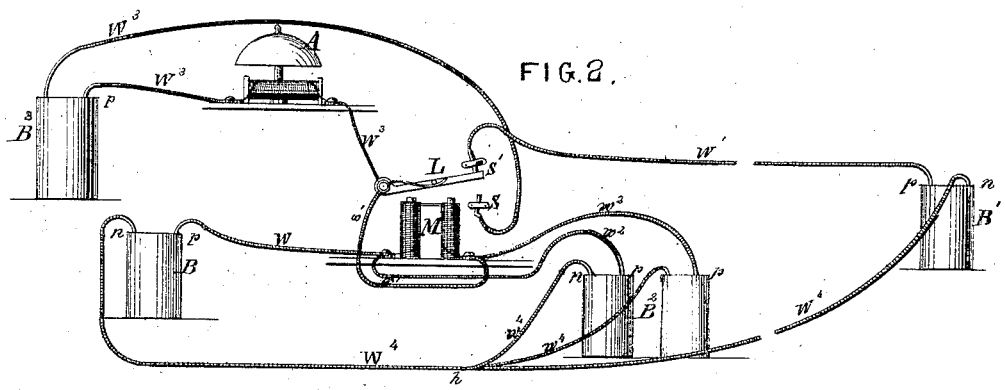
Figure 2 represents an arrangement in which two batteries of equal force, and one of force equal to the other two combined, are so connected as to counteract each other until one of the weaker batteries is cut out.

In fig. 2 is illustrated another arrangement of apparatus, by which the same general results may be effected.

B and B$^1$ may represent single-cell batteries of equal power, and B$^2$ a two-cell battery, having a force double that of each of the others, or equal to both combined.

The positive-poles $p$ $p$ of the batteries B B$^1$ are turned toward each other, and connected through the wires W W$^1$ $w^1$, armature L, and the coils of a magnet, M, or its equivalent.

The positive-pole $p$ of the battery B$^2$ is likewise connected with the wire $w^1$ through branch wires $w^2$.

The negative-poles $n$ $n$ $n$ of the respective batteries are connected in like manner by the wires W$^4$ and $w^4$.

The local circuit W$^3$ and alarm A may be arranged as before described in reference to fig. 1.

It will now be apparent that, while the connections are as shown and the parts in their normal condition, the three batteries will counteract each other, so that no appreciable current will exist in the conducting-wires, and, consequently, the magnet M will be inactive; but in the event of one of the batteries (B, for example) being cut out by short-circuiting its conducting-wires $W^1$ $W^4$, or either of said wires being severed, the battery $B^2$ being of greater power than the battery B will cause a current through the magnet M, rendering it inactive, so as to draw the armature L against the stop S, thus closing the local circuit $W^3$, so as to produce an alarm which will continue until stopped by an authorized party.

The same movement of the armature disconnects it from the back-stop S' at the termination of the wire $W^1$, and thus permanently cuts off the battery $B^1$ from the magnet M, so that no subsequent act performed at the point where the disturbance originated can restore the connection between said battery B and the magnet or counteract the effect of the battery $B^2$.

In practice, the resistance from the magnet each way to the point $h$ should be equal.

This arrangement possesses a special advantage in economy, in that the batteries are inactive in the normal condition of the apparatus, and an advantage in security, in that no current exists in the wires, which might be detected by a galvanometer introduced for an improper purpose.

It will be manifest that the positive and negative-poles of all the batteries may be transposed without changing the invention.

Figure 3:
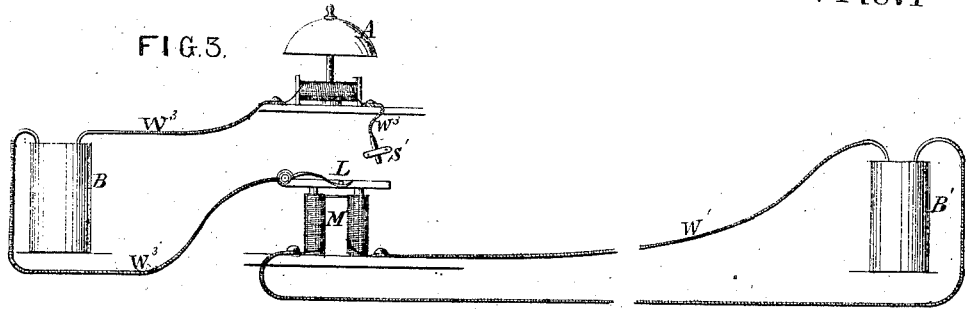
Figure 3 represents a single battery and an alarm mechanism, arranged in such relation to each other that the battery cannot be cut out or its conductor either broken or short-circuited without sounding an alarm.

In fig. 3 I have shown an arrangement under which my invention may be carried out with the use of but one battery, apart from that which may be used in the alarm-circuit, but which latter may be dispensed with entirely, a clock-work or any other suitable motor being used in its stead.

Under the normal condition of this apparatus the magnet M is acted on by the battery $B^1$ so as to draw the armature L away from the back-stop S' and leave the alarm-circuit $W^3$ open.

If, now, the battery-circuit $W^1$ be short-circuited or severed, the magnet M will be demagnetized, releasing the armature L, which, being thrown by a spring or other means against the back-stop S', closes the local circuit $W^3$ so as to sound an alarm.

This alarm may be rendered continuous and placed out of reach of a party at the point of first disturbance by a simple contrivance, which will cause the movement of the armature L or of the bell-armature to break the circuit $W^1$.

In all these various illustrations the battery $B^1$, which is to be disconnected to produce an alarm, is intended to be placed within or at the place to be protected, and the alarm mechanism at the residence or location of the person in charge of the property.

My present invention differs essentially from closed-circuit alarms in present use, in that the latter may be "short-circuited" by an unauthorized party in such a way as to "cut out" the place which it was designed to protect, and thus leave it exposed, whereas in my invention any short-circuiting of the conductor will cut out a battery, severing it from the magnet, and at once cause an alarm.

Those skilled in the art to which my invention appertains will readily understand how the appliances for carrying out my invention may, without departing from its essential principles, be modified in various ways, and how a galvanometer, or other equivalent device, may be substituted for the magnet M. It is therefore unnecessary to enter into a specific description of any such modifications or substitute devices.

The arrangement herein described can be adapted as well for house purposes or any other use where a number of openings are to be protected, the respective wires being so disposed at each of said openings that the forming of a short circuit or connection between them by any act to be detected will cut out the battery.

Claim.

I claim as my invention—

A battery, a conductor, and an alarm mechanism, so arranged and combined that the short-circuiting or severing of the conductor, or the doing of any act which is to be detected, will cut out or disconnect the battery from a magnet or other electro-motor, and thereby cause an alarm.

W. B. GUERNSEY.

Witnesses:
WM. H. BRERETON, Jr.,
OCTAVIUS KNIGHT.